July 7, 1936.  H. R. PRESCOTT ET AL  2,046,843
METHOD OF MAKING GEOPHYSICAL EXPLORATIONS
Filed March 16, 1934
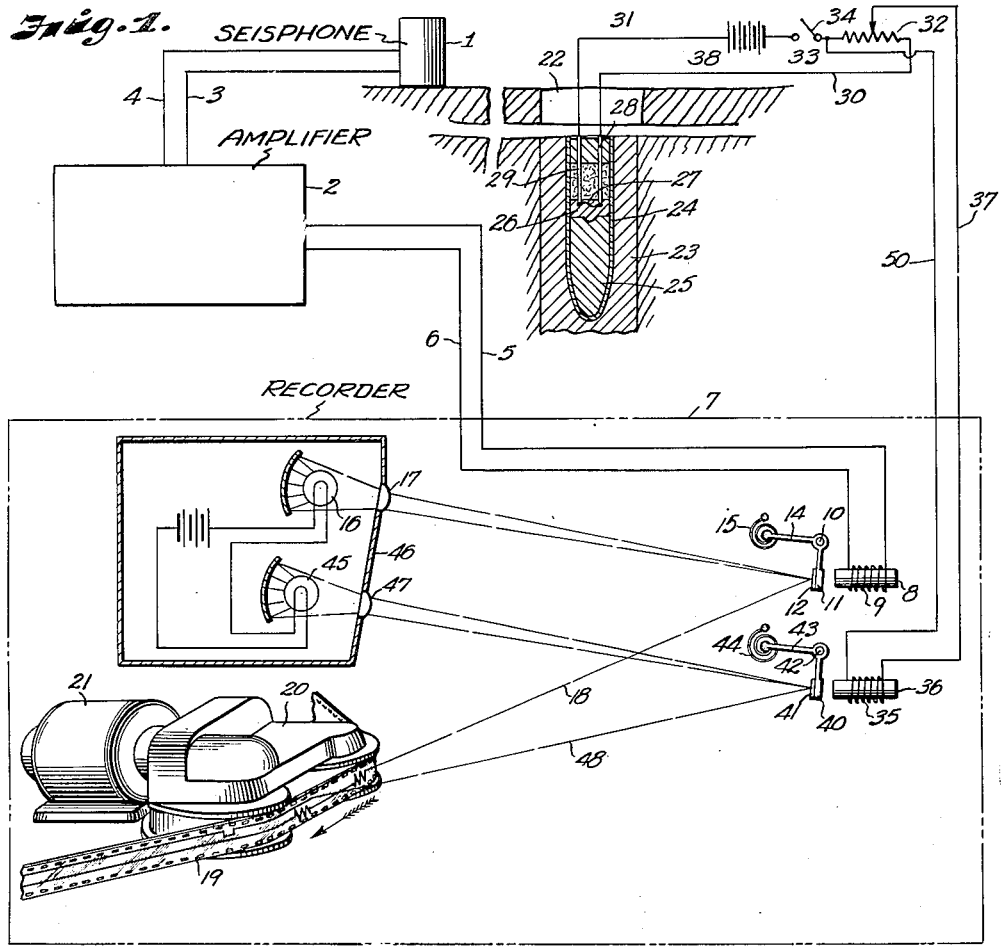
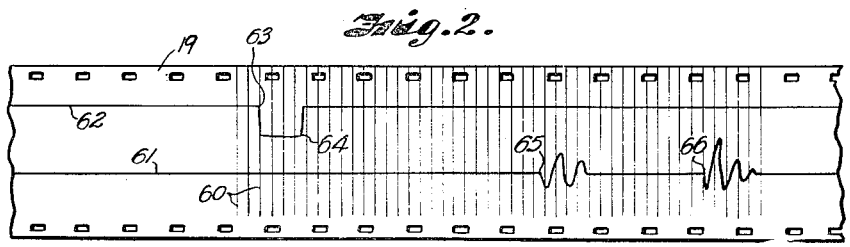
INVENTORS
Harold R. Prescott
and Frank L. Searcy
By Thos. F. Sexfield
ATTORNEY Patented July 7, 1936

2,046,843

UNITED STATES PATENT OFFICE 2,046,843

METHOD OF MAKING GEOPHYSICAL EXPLORATIONS

Harold R. Prescott and Frank L. Searcy, Ponca City, Okla., assignors to Continental Oil Company, Ponca City, Okla., a corporation of Delaware Application March 16, 1934, Serial No. 715,889

1 Claim. (Cl. 181—0.5)

Our invention relates to a method of making geophysical explorations, and more particularly to a means and method of determining the exact instant of detonation, that is, the exact instant of the origin of the elastic wave.

One method of making geophysical explorations comprises creating elastic waves by detonating a charge of explosives at or near the surface of the earth and measuring the time interval elapsing between the time of origin of the elastic waves and the times of arrival of the various reflections of the elastic waves at or near the earth's surface. Since the speed of travel of the elastic waves is high, any error in time results in a large error in the various distances obtained by this method of exploration.

In making explorations, it is customary to deonate a charge of explosive electrically by means of a blasting cap. The blasting cap usually comprises a filament which contacts a detonating substance such as fulminate of mercury or the like. Taking fulminate of mercury as an example, its ignition temperature is about 200° C. An appreciable time interval is necessary before this temperature is reached. Then, too, electric blasting caps are not uniform. A variation for the time to detonate is likely because of conditions in the construction of the caps. The condition of the cap is also a variable. Its temperature, the amount of moisture which may be present, the composition and condition of the fulminate of mercury, and a number of other variable factors enter. The voltages employed and the resistance of the circuit are also variables.

The inaccuracy introduced by assuming the instant the firing key is closed as the time of origin of the elastic waves has been recognized. It has been attempted to apply a large current to an electric blasting cap on the assumption that, in so doing, the instant of the application of the voltage or current is the instant of the blast of the explosive. This assumption, however, is not correct. If the voltage is not sufficiently high, there will be a small time lag after the voltage is applied until the filament in the cap is sufficiently heated to detonate the same. If the voltage is too high, it is possible for a filament to fuse before the surrounding detonating material has been sufficiently heated to detonate. Even with high voltages, a time lag is present.

One object of our invention is to provide a simple means and method for determining the exact instant of the blast of the primer, that is, the time of origin of the elastic waves.

Other and further objects of our invention will be apparent from the following description.

In the accompanying drawing which forms a part of the instant specification, and in which like reference numerals are used to indicate like parts in the various views, Figure 1 is a schematic view showing one form of apparatus embodying our invention.

Figure 2 is a view of a photographic record made by the use of our invention.

Referring now to Figure 1, a seisphone 1 is connected to a suitable amplifying unit 2 by means of conductors 3 and 4. The output of the amplifier is led by conductors 5 and 6 to a recorder 7 in which is positioned a core 8, around which a coil 9 is wound. The output of the amplifier is passed through coil 9. Pivoted on pivot 10 is a magnetic armature 11 carrying a mirror 12. The armature is provided with an arm 14, the end of which is secured to a hair spring 15, which acts as a restoring means. The rays of incandescent light 16 are focused by lens 17 upon mirror 12 and reflected along the path 18 to a moving photographic film 19 which is driven by suitable mechanism 20 operated by motor 21. At a suitable distance from the seisphone 1, preferably at some distance below the surface of the earth in a suitable hole 22 is positioned an explosive charge 23 which may be dynamite or other suitable material. Within the explosive charge 23 we position a blasting cap comprising a shell 24 in which is lodged a booster charge 25 and a detonating charge 26. The detonating chafge surrounds bridge wire 27 which bridges electrodes 28 and 29, which are connected to conductors 30 and 31 respectively. Conductor 31 is connected to one pole of battery 38. The other conductor 30 is connected to the other pole of the battery 38 through resistance 32 and firing key 34 which is adapted to complete the circuit by making contact with point 33 which is connected to the battery. Conductor 50 is connected to one terminal of the resistance 32 at one end and to the coil 35 which is housed in recorder 7, wound around core 36 therewithin.

Within the recorder is positioned a second armature 40 having a mirror 41. The armature is pivoted at 42 and is provided with an arm 43 terminating in a restoring hair spring 44. A second incandescent light 45 is housed within housing 46. The rays of light 45 are focused by lens 47 upon mirror 41 and reflected along the path 48 to the photographic film 19. The other end of coil 35 is connected by conductor 37 by an adjustable contact to the resistance 32. It will be observed that, by moving the resistance to the left, the amount of current flowing through coil 35 may be regulated.

In operation, when it is desired to make an exploration, the apparatus is set up and the firing key 34 depressed. It will be observed that current will flow through the circuit comprising the battery 38, the firing key 34, the entire resistance, conductor 30, electrode 28, bridge wire 27, electrode 29, conductor 31, to the cathode of battery 38. It will also be observed that current will flow through the circuit comprising battery 38, key 34, conductor 50, coil 35, conductor 37, part of resistance 32, conductor 30, electrode 28, bridge wire 27, electrode 29, conductor 31, to the cathode of the battery.

The current flowing through the detonator circuit described above will heat bridge wire 27. The current flowing through the recorder circuit described above will flow through coil 35, energizing the electro-magnet which will attract armature 40, depressing the beam of light 48. As long as the bridge wire 27 is intact, the beam of light 48 will remain depressed. When the explosion takes place, the bridge wire will be ruptured, simultaneously breaking both circuits inasmuch as both circuits have a common return through conductor 31. At this instant, the electro-magnet becoming deenergized will permit the armature 40 to assume its original position.

The velocity of the detonation of fulminate of mercury is 3920 meters per second. There is only about three quarters of an inch of fulminate of mercury in the blasting cap. It will be obvious that the detonation of the fulminate and the detonation of the charge are substantially simultaneous as the time lag is so small as to be practically negligible. It can be assumed, therefore, that the instant the bridge wire breaks is the instant of the detonation of the charge without introducing too great an eror. It will also be obvious that, if we are to assume that the time of the explosion is the time of the application of current, that is, the closing of key 34, that a large error will be introduced. The magnitude of the error can be appreciated by reference to Figure 2 which shows a reproduction of a photographic record taken with the device of our invention, and employing our method. The photographic film 19 has time lines 60 traced thereon by any suitable means, as for example by an oscillograph controlled by a tuning fork. Usually the interval between the timing lines 60 represent one hundredth of a second.

The trace 61 represents a curve traversed by beam 18 which is controlled by the seisphone. The trace 62 represents the path of the beam 48 which is controlled by the current flowing through the bridge wire. Point 63 upon trace 62 represents the instant contact was made by the firing key 34 in completing the circuit. Point 64 represents the instant the circuit was broken. Point 65 represents the first arrival of an elastic wave generated by the detonation of the charge at the seisphone.

In the making of geophysical explorations, the time lapses from the instant of the blast to the various arrivals are of extreme importance and are necessary in making the necessary computations involved. The accuracy of the work depends upon the accuracy of the instant of the blast. It will be obvious that, in the case shown in Figure 2, over .035 of a second will elapse between the closing of the firing circuit and the instant of the blast. This variation in the instant of the blast would seriously affect the accuracy of the computations if it were assumed that the point 63 were the time of origin of the elastic waves.

It will be obvious that we have accomplished the objects of our invention. We have provided a simple and expeditious manner of accurately determining the instant of origin of the elastic waves. It is to be understood that we do not intend to limit our invention to the details disclosed, which are merely illustrative of the principle of our invention. For example, instead of employing an oscillograph and mirror, we may control the circuit of a radio transmitter so that the record may be made at a distance from the point of observation. Any suitable means for recording the variations of the current in the recorder circuit will serve to indicate the time of origin of the blast.

It should be remembered that the resistance 32 should be such that the current flowing through bridge wire 27 cannot fuse or rupture the bridge wire. This is of importance as we desire that the detonation of the charge do the interrupting of the current. In practice we have found that a current of .5 or .6 of an ampere will be carried safely by the bridge wires of most caps and supply sufficient heat to initiate the detonation of the primer.

Having thus described our invention, what we claim is:

An electrical circuit for detonating an explosive charge in the making of geophysical explorations, comprising a bridge wire of a detonator, a source of potential and a resistance connected in series; a shunt circuit for said resistance, and means for recording fluctuations of curent in said shunt circuit.

HAROLD R. PRESCOTT.
FRANK L. SEARCY.